(12) United States Patent
Koga et al.

(10) Patent No.: US 10,753,914 B2
(45) Date of Patent: Aug. 25, 2020

(54) FLOW CONTROLLER (71) Applicant: Shimadzu Corporation, Kyoto (JP)

(72) Inventors: Kiyonori Koga, Kyoto (JP); Yuki Komori, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 175 days.

(21) Appl. No.: 16/099,234

(22) PCT Filed: Jun. 30, 2016

(86) PCT No.: PCT/JP2016/069367
§ 371 (c)(1),
(2) Date: Nov. 6, 2018

(87) PCT Pub. No.: WO2018/003046
PCT Pub. Date: Jan. 4, 2018

(65) Prior Publication Data
US 2019/0212308 A1    Jul. 11, 2019

(51) Int. Cl.
*G01N 30/32*    (2006.01)
*G01N 30/46*    (2006.01)
(Continued)

(52) U.S. Cl.
CPC .......... *G01N 30/32* (2013.01); *G01N 30/466* (2013.01); *G01N 30/04* (2013.01); *G01N 2030/025* (2013.01); *G01N 2030/328* (2013.01)

(58) Field of Classification Search
None
See application file for complete search history.

(56) References Cited

U.S. PATENT DOCUMENTS 5,534,328 A * 7/1996 Ashmead .............. B01F 5/0604
                                                    210/150
5,872,010 A * 2/1999 Karger ................. B01J 19/0093
                                                    436/173
(Continued)

FOREIGN PATENT DOCUMENTS

JP    2005-156214 A    6/2005

OTHER PUBLICATIONS

International Search Report and Written Opinion dated Oct. 4, 2016 of corresponding International Application No. PCT/JP2016/069367; 4 pgs.

*Primary Examiner* — Jill E Culler
(74) *Attorney, Agent, or Firm* — Maier & Maier, PLLC (57) ABSTRACT

A flow controller includes a channel assembly, a pressure sensor, and a pressure control valve. The channel assembly includes a laminated substrate comprised of a plurality of substrates laminated, the laminated substrate having a surface on which a gas inlet and a gas outlet are formed, and having, inside the laminated substrate, a plurality of resistance channels not communicating with one another inside the laminated substrate as internal channels. In the flow controller, the gas inlet and the gas outlet communicate to each other to form a flow rate control channel. The pressure sensor and the pressure control valve are provided on the flow rate control channel. At least one of the resistance channels which is selected to have a desired channel resistance of the flow rate control channel is connected to the flow rate control channel as part of the flow rate control channel.

2 Claims, 5 Drawing Sheets (51) Int. Cl.
*G01N 30/04* (2006.01)
*G01N 30/02* (2006.01)

(56) References Cited

U.S. PATENT DOCUMENTS

| | | | |
|---|---|---|---|
| 6,532,978 B1* | 3/2003 | Muller-Kuhrt | G05D 11/132 137/1 |
| 2005/0109079 A1 | 5/2005 | Furukawa | |
| 2009/0101017 A1* | 4/2009 | Furukawa | G01N 30/38 96/105 |

* cited by examiner

FLOW CONTROLLER

FIELD

The present invention relates to a flow controller of gas chromatography.

BACKGROUND

Gas chromatography uses a flow controller to control the flow rate of gas such as carrier gas. A flow controller for gas chromatography is generally configured such that pressure control valves, pressure sensors, and pipes are connected to a channel assembly comprised of a plurality of metal plates laminated and having channels inside thereof (see Patent Document 1). When controlling the flow rate of gas using a pressure sensor, the flow rate of gas is controlled by connecting a resistance pipe to a downstream side of a channel assembly, adjusting the channel resistance of a channel where the gas flows to a certain channel resistance value, and exerting feedback control on a pressure control valve to control the degree of opening based on a pressure value detected by the pressure sensor.

Examples of a detector for gas chromatography include a flame ionization detector (FID), a thermal conductivity detector (TCD), a flame photometric detector (FPD), and a flame thermionic detector (FTD). Kinds and the number of gasses, the flow rate of which need to be controlled, differ depending on the types of the detectors, and the channel resistance needed for the flow controller differs depending on the types of the detectors. Different types of detectors therefore need respective flow controllers; however, a dedicated flow controller for each type of detector increases the cost. Thus, the flow controller suitable for each detector is configured by changing types of a resistance pipe to achieve a certain relationship between the pressure and the flow rate depending on the type of the detector, while employing the same basic configuration of the flow controller.

PATENT DOCUMENT 1: Japanese Unexamined Patent Publication No. 2005-156214

SUMMARY

In a conventional flow controller, a resistance pipe is fixed by attaching the resistance pipe to a rubber plug, called a septum, on a downstream side of a channel assembly. In this configuration, however, volatile components coming from the rubber plug adversely affect the analysis. As one of solutions, a resistance channel corresponding to a resistance pipe may be arranged inside the channel assembly with the intention to add the same function as that of the resistance pipe to a channel inside the channel assembly. The resistance channel formed inside the channel assembly, however, makes it impossible to adjust the channel resistance by changing the external resistance pipes, and respective different channel assemblies are therefore necessary depending on the types of detectors on which the flow controllers are employed.

The cost of a metal plate forming the channel assembly is determined based on the number of metal plates produced in one batch. A dedicated channel plate for a flow controller for small lot production therefore increases the cost. As one of solutions, channel resistances for all types of flow controllers may be formed on one channel plate. This configuration, however, increases the size of the channel assembly and increases the installation space because each resistance needs a space for a pressure sensor on the upstream side.

In view of the foregoing background, it is an object of the present invention to provide a flow controller that eliminates the necessity of preparing different channel assemblies for respective types of flow controllers.

A flow controller according to the present invention includes a channel assembly, a pressure sensor, and a pressure control valve. The channel assembly includes a laminated substrate comprised of a plurality of substrates laminated, the laminated substrate having a surface on which a gas inlet and a gas outlet are formed, and having, inside the laminated substrate, a plurality of resistance channels not communicating with one another inside the laminated substrate as internal channels. A pressure sensor is connected to a corresponding one of the internal channels through a hole formed on a surface of the channel assembly. A pressure control valve is connected to a corresponding one of the internal channels through a hole formed on the surface of the channel assembly. In the flow controller, the gas inlet and the gas outlet communicate to each other to form a flow rate control channel. The pressure sensor and the pressure control valve are provided on the flow rate control channel. At least one of resistance channels which is selected to have a desired channel resistance of the flow rate control channel is connected to the flow rate control channel as part of the flow rate control channel.

In one preferred embodiment of the flow controller of the present invention, the channel assembly includes a plurality of the gas inlets and the gas outlets, and the gas inlet and the gas outlet which are selected based on a type of gas used in a detector for which the flow controller is employed, communicate to each other to form the flow rate control channel. This configuration allows one flow controller to control flow rates of a plurality of types of gases.

The flow controller of the present invention uses a channel assembly having a plurality of resistance channels not communicating with one another inside the assembly, and at least one of resistance channels which is selected to have a desired channel resistance of the flow rate control channel is connected to the flow rate control channel as part of the flow rate control channel. In other words, the channel resistance value of the flow rate control channel is adjusted by connecting a resistance channel selected from a plurality of resistance channels formed inside the channel assembly to the flow rate control channel. Thus, the same channel assembly can be used in common for different types of detectors, which eliminates the necessity of preparing a channel assembly for each type of detector. Consequently, the production cost can be reduced.

DETAILED DESCRIPTION

Embodiments of a flow controller according to the present invention will be described in detail below with reference to the drawings.

Figure 1:
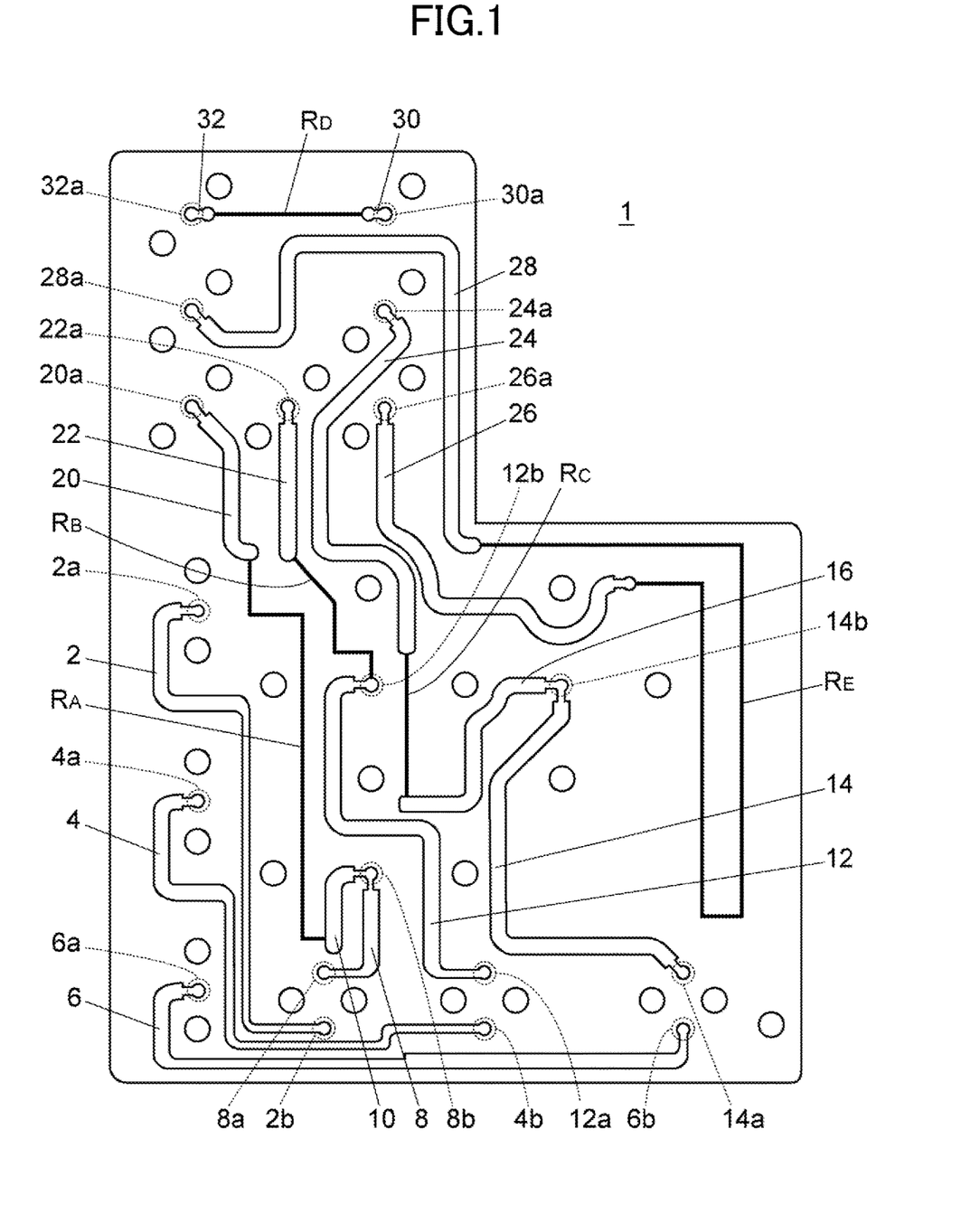
FIG. 1 is a schematic structural plan view that illustrates an exemplary configuration of a channel assembly used for a flow sensor.

FIG. 1 is a plan view that illustrates an inner configuration of a channel assembly 1 used in common in flow controllers for various types of detectors. This channel assembly 1 is comprised of a plurality of metal plates laminated, and a plurality of internal channels are formed on the inner joint surfaces of the metal plates. FIG. 1 depicts as if all internal channels formed on the inner joint surfaces of the channel assembly 1 were formed in the same plane (in the same joint surface); however, the internal channels are not necessarily formed in the same plane (in the same joint surface) and may be formed in a plurality of joint surfaces. Circles in solid lines depicted separately from the internal channels represent holes for allowing bolts to pass therethrough to fix another channel plate, a pressure control valve, a pressure sensor, and others to the channel assembly 1.

Channels 2, 4, 6, 8, 10, 12, 14, 16, 20, 22, 24, 26, 28, 30, and 32 and resistance channels $R_A$ (the channel resistance value: $R_A$), $R_B$ (the channel resistance value: $R_B$), $R_C$ (the channel resistance value: $R_C$), $R_D$ (the channel resistance value: $R_D$), and $R_E$ (the channel resistance value: $R_E$) are formed as internal channels. Circles 2a, 2b, 4a, 4b, 6a, 6b, 8a, 8b, 12a, 12b, 14a, 14b, 20a, 22a, 24a, 26a, 28a, 30a, and 32a in broken lines represent holes communicating with ends of the respective internal channels and formed on a front surface or a back surface of a channel assembly 1. An external pipe, another channel plate, a pressure control valve, a pressure sensor, and others are connected with the internal channels of the channel assembly 1 through these holes.

The channel assembly 1 of this embodiment is applicable to a flow controller which controls the flow rates of three types of gases at the same time. In other words, three independent flow rate control channels can be constructed by combining the above-described internal channels.

A first flow rate control channel is comprised of the channel 2, the channel 8, the channel 10, the resistance channel $R_A$, and the channel 20. The flow channel 28, the resistance channel $R_E$, and the channel 26 may be added to these channels as necessary. The hole 2a communicating with one end of the channel 2 is a gas inlet, and an external pipe supplying a specific gas is connected to the hole 2a.

The other end of the channel 2 and one end of the channel 8 are connected with an inlet and an outlet of a pressure control valve through the hole 2b and the hole 8a, respectively. That is, the pressure control valve is interposed between the channel 2 and the channel 8. The other end of the channel 8 is connected with a pressure sensor through the hole 8b. The other end of the channel 8 and one end of the channel 10 are connected with each other. The other end of the channel 10 is connected with one end of the resistance channel $R_A$.

The other end of the resistance channel $R_A$ is connected with one end of the channel 20. The other end of the channel 20 is connected with an external pipe or another channel plate through the hole 20a. The other end of the channel 20 and one end of the channel 28 are connected with each other through another channel plate as necessary. In the case where the other end of the channel 20 and the one end of the channel 28 are not connected with each other, the other end of the channel 20 is connected with an external pipe through the hole 20a, which serves as a gas outlet for discharging gas from the first flow rate control channel.

The other end of the channel 28 is connected with one end of the resistance channel $R_E$. The other end of the resistance channel $R_E$ is connected with one end of the channel 26. The other end of the channel 26 is connected with an external pipe through the hole 26a. In the case where the other end of the channel 20 and the one end of the channel 28 are connected with each other, the hole 26a communicating with the other end of the channel 26 serves as a gas outlet for discharging gas from the first flow rate control channel.

A second flow rate control channel is comprised of the channel 4, the channel 12, the resistance channel $R_B$, and the channel 22. The hole 4a communicating with one end of the channel 4 is a gas inlet, and an external pipe supplying a specific gas is connected to the hole 4a.

The other end of the channel 4 and one end of the channel 12 are connected with an inlet and an outlet of a pressure control valve through the hole 4b and the hole 12a, respectively. That is, the pressure control valve is interposed between the channel 4 and the channel 12. The other end of the channel 12 is connected with a pressure sensor through the hole 12b. The other end of the channel 12 is connected with one end of the resistance channel $R_B$.

The other end of the resistance channel $R_B$ is connected with an end of the channel 22. The other end of the channel 22 is connected with an external pipe through the hole 22a, which serves as a gas outlet for discharging gas from the second flow rate control channel.

A third flow rate control channel is comprised of the channel 6, the channel 14, the channel 16, the resistance channel $R_C$, and the channel 24. The channel 30, the resistance channel $R_E$, and the channel 32 may be added to these channels as necessary. The hole 6a communicating with one end of the channel 6 is a gas inlet, and an external pipe supplying a specific gas is connected to the hole 6a.

The other end of the channel 6 and one end of the channel 14 are connected with an inlet and an outlet of a pressure control valve through the hole 6b and the hole 14a, respectively. That is, the pressure control valve is interposed between the channel 6 and the channel 14. The other end of the channel 14 is connected with a pressure sensor through the hole 14b. The other end of the channel 14 and one end of the channel 16 are connected with each other. The other end of the channel 16 is connected with one end of the resistance channel $R_C$.

The other end of the resistance channel $R_C$ is connected with one end of the channel 24. The other end of the channel 24 is connected with an external pipe or another channel plate through the hole 24a. The other end of the channel 24 and one end of the channel 30 are connected with each other through another channel plate as necessary. In the case where the other end of the channel 24 and the one end of the channel 30 are not connected with each other, an external pipe is connected to the other end of the channel 24 through the hole 24a, which serves as a gas outlet for discharging gas from the third flow rate control channel.

The other end of the channel 30 is connected with one end of the resistance channel $R_D$. The other end of the resistance channel $R_D$ is connected with one end of the channel 32. An external pipe is connected to the other end of the channel 32 through the hole 32a. In the case where the other end of the channel 24 and the one end of the channel 30 are connected with each other, the hole 32a communicating with the other end of the channel 32 serves as a gas outlet for discharging gas from the third flow rate control channel.

FIG. 2 to FIG. 5 are drawings of channel structures of flow controllers for use for a flame ionization detector (FID), a thermal conductivity detector (TCD), a flame photometric detector (FPD), and a flame thermionic detector (FTD). In each channel structure, the above-described channel assembly 1 is employed. Description will be given on each type of detector.

<FID>

Figure 2:
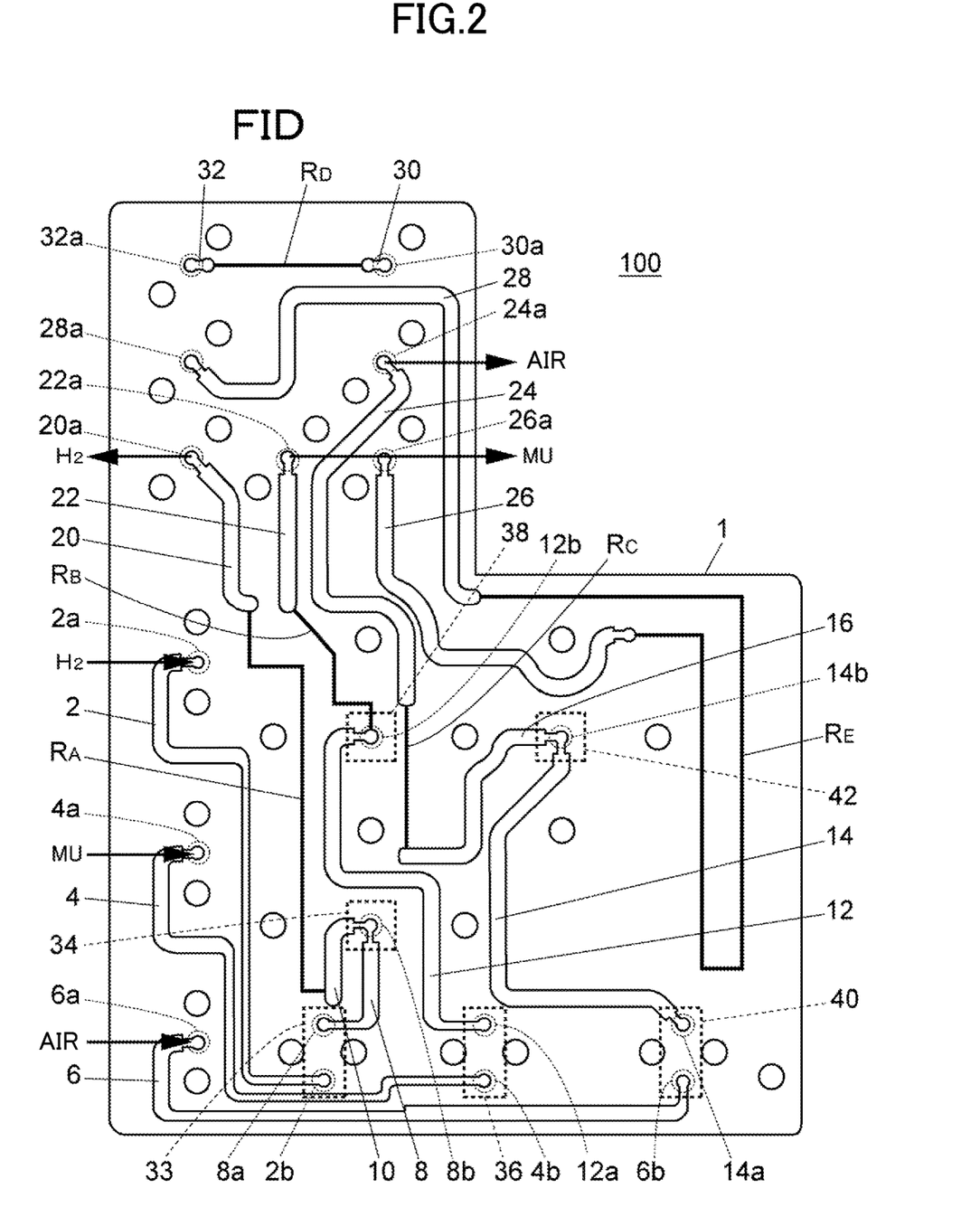
FIG. 2 is a schematic structural plan view that illustrates a configuration of a flow controller for an FID using the channel assembly.

An FID uses hydrogen gas ($H_2$), inorganic gas (MU), and air. The FID needs channel resistances $R_A$, $R_B$, and $R_C$ for controlling flow rates of hydrogen gas, inorganic gas, and air, respectively. As illustrated in FIG. 2, an FID flow controller 100 controls the flow rate of hydrogen gas using the first flow rate control channel, controls the flow rate of inorganic gas using the second flow rate control channel, and controls the flow rate of air using the third flow rate control channel. To form the first to third flow rate control channels, pressure control valves 33, 36, and 40 are respectively provided at a position corresponding to the holes 2b and 8a, a position corresponding to the holes 4b and 12a, and a position corresponding to the holes 6b and 14a. In addition, pressure sensors 34, 38, and 42 are respectively provided at a position corresponding to the hole 8b, a position corresponding to the hole 12b, and a position corresponding to the hole 14b.

Hydrogen gas is introduced into the first flow rate control channel through the gas inlet 2a, passes through the channel 2, the pressure control valve 33, the channel 8, the channel 10, the resistance channel $R_A$, and the channel 20, and is discharged from the gas outlet 20a. The channel resistance $R_A$ necessary for controlling the flow rate of hydrogen gas supplied to the FID is obtained through the formation of the first flow rate control channel. The flow rate of hydrogen gas is controlled by the pressure control valve 33 exerting feedback control based on a detection value of the pressure sensor 34.

Inorganic gas is introduced into the second flow rate control channel through the gas inlet 4a, passes through the channel 4, the pressure control valve 36, the channel 12, the resistance channel $R_B$, and the channel 22, and is discharged from the gas outlet 22a. The channel resistance $R_B$ necessary for controlling the flow rate of inorganic gas supplied to the FID is obtained through the formation of the second flow rate control channel. The flow rate of inorganic gas is controlled by the pressure control valve 36 exerting feedback control based on a detection value of the pressure sensor 38.

Air is introduced to the third flow rate control channel through the gas inlet 6a, passes through the channel 6, the pressure control valve 40, the channel 14, the channel 16, the resistance channel $R_C$, and the channel 24, and is discharged from the gas outlet 24a. The channel resistance $R_C$ necessary for controlling the flow rate of air supplied to the FID is obtained through the formation of the third flow rate control channel. The flow rate of air is controlled by the pressure control valve 40 exerting feedback control based on a detection value of the pressure sensor 42.

<TCD>

Figure 3:
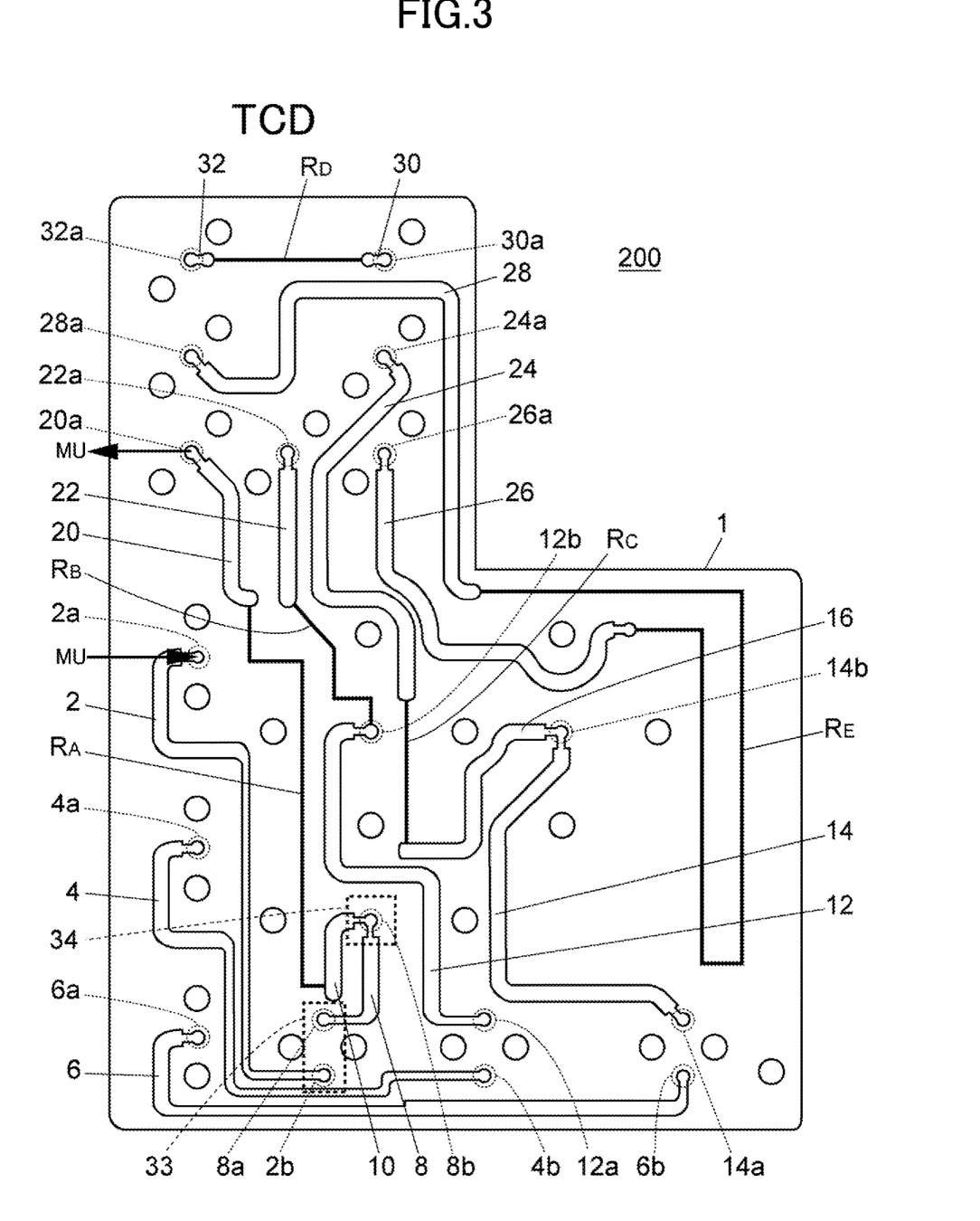
FIG. 3 is a schematic structural plan view that illustrates a configuration of a flow controller for a TCD using the channel assembly.

A TCD uses only inorganic gas. The TCD needs channel resistance $R_A$ for controlling the flow rate of inorganic gas. As illustrated in FIG. 3, a TCD flow controller 200 controls the flow rate of inorganic gas using the first flow rate control channel. To form the first flow rate control channel, the pressure control valve 33 is provided at a position corresponding to the holes 2b and 8a, and the pressure sensor 34 is provided at a position corresponding to the hole 8b.

Inorganic gas is introduced into the first flow rate control channel through the gas inlet 2a, passes through the channel 2, the pressure control valve 33, the channel 8, the channel 10, the resistance channel $R_A$, and the channel 20, and is discharged from the gas outlet 20a. The channel resistance $R_A$ necessary for controlling the flow rate of inorganic gas supplied to the TCD is obtained through the formation of the first flow rate control channel. The flow rate of inorganic gas is controlled by the pressure control valve 33 exerting feedback control based on a detection value of the pressure sensor 34.

<FPD>

Figure 4:
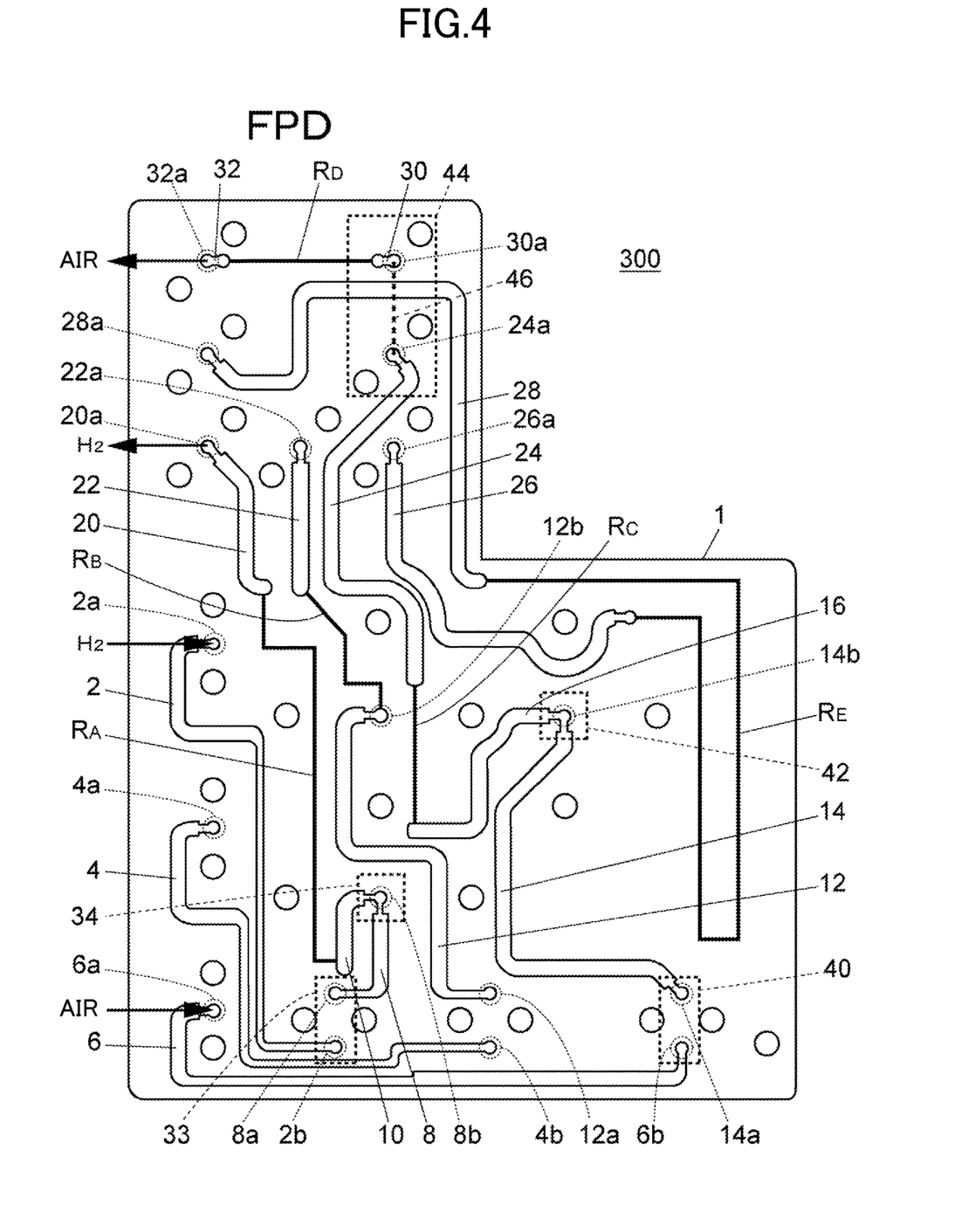
FIG. 4 is a schematic structural plan view that illustrates a configuration of a flow controller for an FPD using the channel assembly.

An FPD uses hydrogen gas and air. The FPD uses channel resistances $R_A$, and $R_C+R_D$, for controlling the flow rate of hydrogen gas and air. As illustrated in FIG. 4, an FPD flow controller 300 controls the flow rate of hydrogen gas using the first flow rate control channel, and controls the flow rate of air using the third flow rate control channel. To form the first and third flow rate control channels, pressure control valves 33 and 40 are provided at a position corresponding to the holes 2b and 8a and at a position corresponding to the holes 6b and 14a, respectively, and pressure sensors 34 and 42 are provided at a position corresponding to the hole 8b and at a position corresponding to the hole 14b, respectively. Furthermore, the channel assembly 1 is provided with a channel plate 44 having a bypass channel 46 for communicating the hole 24a and the hole 30a so that the third flow rate control channel has channel resistance of $R_C+R_D$.

Hydrogen gas is introduced into the first flow rate control channel through the gas inlet 2a, passes through the channel 2, the pressure control valve 33, the channel 8, the channel 10, the resistance channel $R_A$, and the channel 20, and is discharged from the gas outlet 20a. The channel resistance $R_A$ necessary for controlling the flow rate of hydrogen gas supplied to the FPD is obtained through the formation of the first flow rate control channel. The flow rate of hydrogen gas is controlled by the pressure control valve 33 exerting feedback control based on a detection value of the pressure sensor 34.

Air is introduced into the third flow rate control channel through the gas inlet 6a, passes through the channel 6, the pressure control valve 40, the channel 14, the channel 16, the resistance channel $R_C$, the channel 24, the bypass channel 46, the channel 30, the resistance channel $R_D$, and the channel 32, and is discharged from the gas outlet 32a. The channel resistance $R_C+R_D$ necessary for controlling the flow rate of air supplied to the FPD is obtained through the formation of the third flow rate control channel. The flow rate of air is controlled by the pressure control valve 40 exerting feedback control based on a detection value of the pressure sensor 42.

<FTD>

Figure 5:
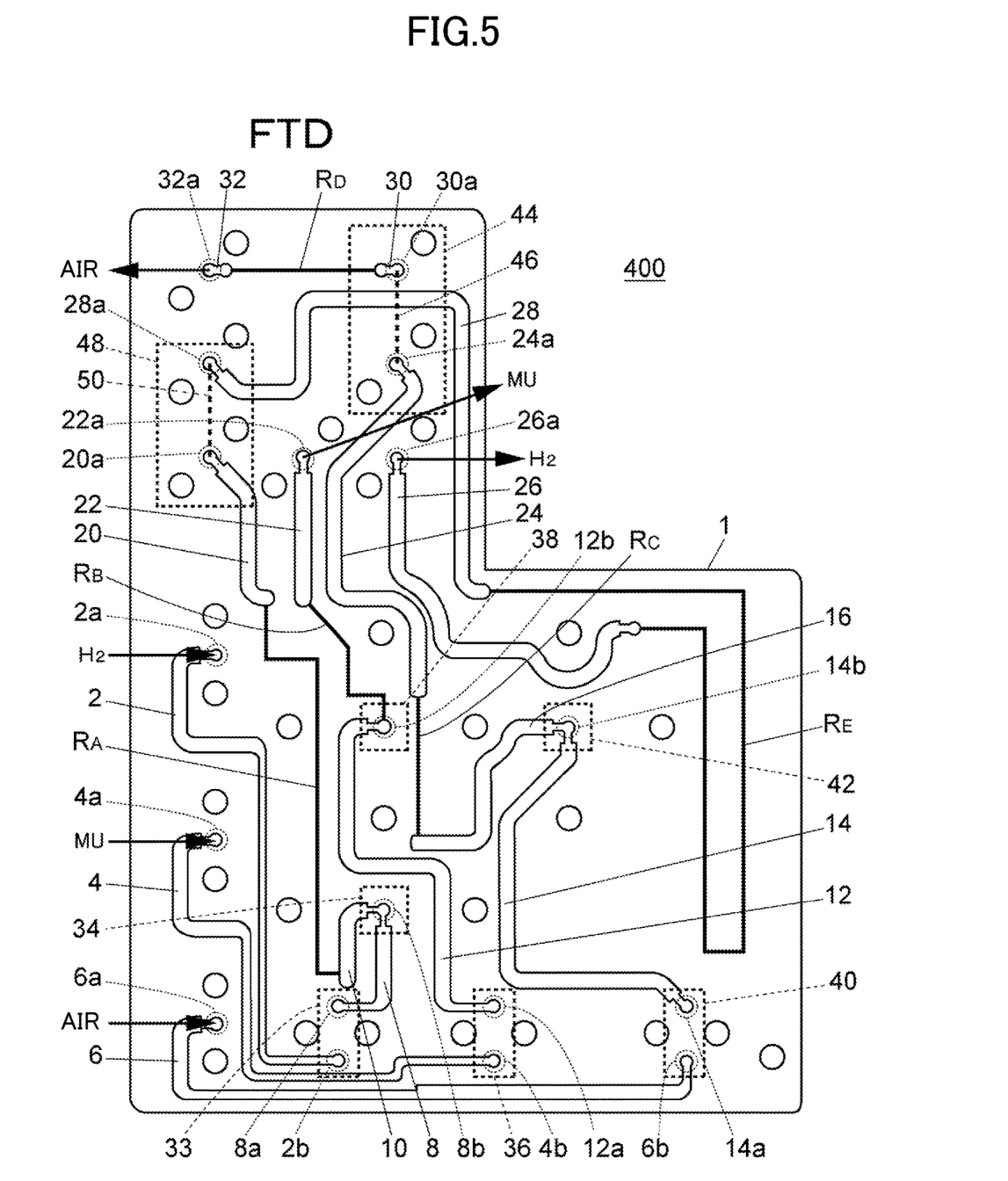
FIG. 5 is a schematic structural plan view that illustrates a configuration of a flow controller for an FTD using the channel assembly.

An FTD uses hydrogen gas ($H_2$), inorganic gas (MU), and air. The FTD uses channel resistances $R_A+R_E$, $R_B$, and $R_C+R_D$ for controlling the flow rates of hydrogen gas, inorganic gas, and air, respectively. As illustrated in FIG. 5, an FTD flow controller 400 controls the flow rate of hydrogen gas using the first flow rate control channel, controls the flow rate of inorganic gas using the second flow rate control channel, and controls the flow rate of air using the third flow rate control channel. To form the first to third flow rate control channels, pressure control valves 33, 36, and 40 are provided at a position corresponding to the holes 2b and 8a, at a position corresponding to the holes 4b and 12a, and at a position corresponding to the holes 6b and 14a, respectively, and pressure sensors 34, 38, and 42 are provided at a position corresponding to the hole 8b, at a position corresponding to the hole 12b, and at a position corresponding to the hole 14b, respectively. Furthermore, the channel assembly 1 is provided with a channel plate 48 having a bypass channel 50 for communicating the hole 20a and the hole 28a so that the first flow rate control channel has channel resistance of $R_A+R_E$. The channel assembly 1 is further provided with the channel plate 44 having the bypass channel 46 for communicating the hole 24a and the hole 30a so that the third flow rate control channel has channel resistance of $R_C+R_D$.

Hydrogen gas is introduced into the first flow rate control channel through the gas inlet 2a, passes through the channel 2, the pressure control valve 33, the channel 8, the channel 10, the resistance channel $R_A$, the channel 20, the bypass channel 50, the channel 28, the resistance channel $R_E$, and the channel 26, and is discharged from the gas outlet 26a. The channel resistance $R_A+R_E$ necessary for controlling the flow rate of hydrogen gas supplied to the FTD is obtained through the formation of the first flow rate control channel. The flow rate of hydrogen gas is controlled by the pressure control valve 33 exerting feedback control based on a detection value of the pressure sensor 34.

Inorganic gas is introduced into the second flow rate control channel through the gas inlet 4a, passes through the channel 4, the pressure control valve 36, the channel 12, the resistance channel $R_B$, and the channel 22, and is discharged from the gas outlet 22a. The channel resistance $R_B$ necessary for controlling the flow rate of inorganic gas supplied to the FID is obtained through the formation of the second flow rate control channel. The flow rate of inorganic gas is controlled by the pressure control valve 36 exerting feedback control based on a detection value of the pressure sensor 38.

Air is introduced into the third flow rate control channel through the gas inlet 6a, passes the channel 6, the pressure control valve 40, the channel 14, the channel 16, the resistance channel $R_C$, the channel 24, the bypass channel 46, the channel 30, the resistance channel $R_D$, and the channel 32, and is discharged from the gas outlet 32a. The channel resistance $R_C+R_D$ necessary for controlling the flow rate of air supplied to the FPD is obtained through the formation of the third flow rate control channel. The flow rate of air is controlled by the pressure control valve 40 exerting feedback control based on a detection value of the pressure sensor 42.

As described above, the channel assembly 1 has a plurality of resistance channels $R_A$ (the channel resistance value: $R_A$), $R_B$ (the channel resistance value: $R_B$), $R_C$ (the channel resistance value: $R_C$), $R_D$ (the channel resistance value: $R_D$), and $R_E$ (the channel resistance value: $R_E$), which do not communicate with one another inside the channel assembly 1. The channel assembly 1 is configured such that an additional resistance channel that is needed depending on types of the flow controller (types of the detector for which the flow controller is used) is provided in the flow rate control channel. This configuration allows configuration of various types of the flow controller, using the same channel assembly in common.

The invention claimed is:

1. A flow controller, comprising:
   a channel assembly that includes a laminated substrate comprised of a plurality of substrates laminated, the laminated substrate having a surface on which a gas inlet and a gas outlet are formed, and having, inside the laminated substrate, a plurality of resistance channels not communicating with one another inside the laminated substrate as internal channels;
   a pressure sensor that is connected with a corresponding one of the internal channels through a hole formed on a surface of the channel assembly; and
   a pressure control valve that is connected with a corresponding one of the internal channels through a hole formed on the surface of the channel assembly,
   wherein
   the gas inlet and the gas outlet communicate to each other to form a flow rate control channel,
   the pressure sensor and the pressure control valve are provided on the flow rate control channel, and
   at least one of the resistance channels which is selected to have a desired channel resistance of the flow rate control channel is connected to the flow rate control channel as part of the flow rate control channel.

2. The flow controller of claim 1, wherein the channel assembly includes a plurality of the gas inlets and the gas outlets, and
   the gas inlet and the gas outlet which are selected based on a type of gas used in a detector for which the flow controller is employed, communicate to each other to form the flow rate control channel.

* * * * *